Figure 1:
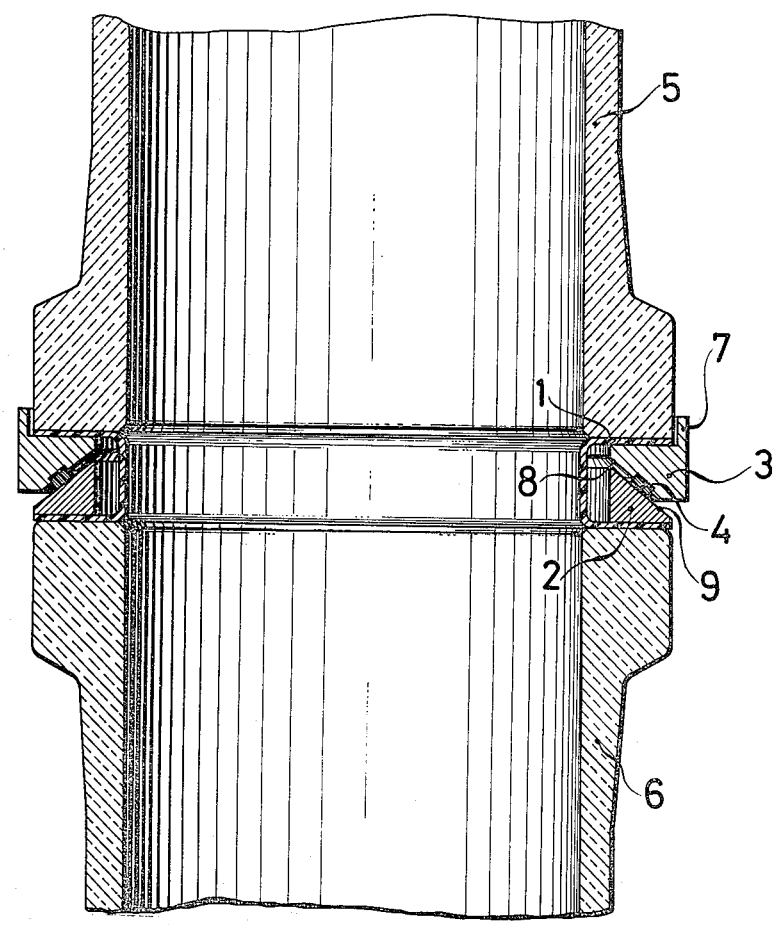

United States Patent [19]

Oberle et al.

[11] 4,318,548
[45] Mar. 9, 1982

[54] ANGULARLY ADAPTABLE SEAL

[75] Inventors: Ingrid Oberle, Dorsheim; Jens Bahr, Ingelheim, both of Fed. Rep. of Germany

[73] Assignee: Jenaer, Glaswerk, Schott & Gen., Fed. Rep. of Germany

[21] Appl. No.: 159,194

[22] Filed: Jun. 13, 1980

[30] Foreign Application Priority Data

Jun. 13, 1979 [DE] Fed. Rep. of Germany ....... 2923924

[51] Int. Cl.³ .......................... F16J 15/10; F16L 27/00
[52] U.S. Cl. ................................... 277/207 A; 285/184;
285/334.4; 285/DIG. 11; 277/169; 277/190
[58] Field of Search ...................... 285/184, 223, 332.1, 285/334.4, DIG. 11; 277/207 A, 207 R, 117–122, 190, 169

[56] References Cited
U.S. PATENT DOCUMENTS

| 839,090 | 12/1906 | Ayer | 285/332.1 |
| 1,563,836 | 12/1925 | Copp | 277/169 |
| 2,523,995 | 9/1950 | Parmeson | 285/332.1 X |
| 3,207,523 | 9/1965 | Johnson | 277/190 X |

FOREIGN PATENT DOCUMENTS

| 805469 | 5/1951 | Fed. Rep. of Germany | 285/184 |
| 2031353 | 12/1971 | Fed. Rep. of Germany | 285/334.4 |
| 1038391 | 5/1953 | France | 285/184 |
| 863390 | 3/1961 | United Kingdom | 285/334.4 |
| 1152759 | 5/1969 | United Kingdom | 285/334.4 |

Primary Examiner—Robert S. Ward, Jr.
Attorney, Agent, or Firm—Quaintance & Murphy

[57] ABSTRACT

Two pipeline components (5) and (6) are sealed together by a seal comprising a U-section casing (1) and a pair of rings (2) and (3) which are surrounded at their inner diameter and at their outer end surfaces by the casing (1). Adjacent inner end surfaces (9) and (8) the rings (2) and (3) are respectively, externally and internally spherical, the inner end surface (8) being generally conical with a recess therein to receive a P.T.F.E. slider (4). A centering collar (7) is provided on the ring (3). The axes of the components (5) and (6) can be misaligned by an angle α while the seal is maintained because of relative sliding action which is permitted between the surfaces (8) and (9) and because of permitted deformation of the casing (1) which is formed of an elastic and chemically resistant material.

5 Claims, 2 Drawing Figures

ANGULARLY ADAPTABLE SEAL

In joints between component parts of apparatus assemblies or pipeline constructions which have planar sealing surfaces, it is a strict requirement that the two sealing surfaces which are to be joined must be plane-parallel in order to achieve even stress distribution over the seal and thus ensure functional reliability.

Since, on the other hand, the axes of such assembled components must be in line, it follows that high precision standards must be applied in respect of the arrangement of the sealing surfaces at right angles to the axis of the component.

Where such components are made from elastic materials (as for example steel or plastics materials), these standards can be adequately satisfied by the usual manufacturing tolerances at the sealing surfaces in combination with the available degree of slight deformability on the part of seal, flange and pipe without setting up undue stresses.

With brittle materials, however (e.g. glass, stoneware etc.) only the very smallest additional bending strain may be introduced into the components in their installation. For the same reason, screw tightening torque ratings and therefore the available range of seal deformation are here considerably lower, that is to say, with these materials extremely close tolerance limits must be applied in respect of the perpendicularity of the sealing surface relative to the component axis, which can only be adhered to by high, and therefore expensive, manufacturing standards.

Consequently, for pipe-line components with planar sealing surfaces which are not precisely at right angles to the pipe axis, a seal construction is needed which affords a certain amount of angular adaptability to compensate for the tolerance in perpendicularity of the sealing surfaces relative to the pipe axis so that the pipes can be laid in precise alignment without constraint which would set up flexural tensile stresses.

On the other hand, in many pipelines, a facility of angular deviation from axial alignment is required so that certain pipeline stretches may be laid with more or less gradient either for drainage purposes or in order to adapt the pipeline to local terrain conditions without major difficulty. In both these cases, the demand for angular adaptability is generally even greater than in the first mentioned case.

In order to cope with this problem, especially where pipelines of brittle materials are concerned, it is known to adopt the following expedients:

1. Installation of bellows:

Apart from costs, these have the disadvantages of restricted pressure and temperature-durability, additional reaction forces applied to adjacent parts, increased flow resistance and risk of incrustation with product residues and dirt accretions.

2. Installation of seals with elastic inserts:

These provide a very imperfect answer to the problem because of their very small amount of resilience.

3. Installation of unequal thickness lining seals:

These must be individually tailored and their reliable lasting sealing effect is highly questionable.

4. The use of spherically machined sealing surfaces (ball and cup) on the components which are to be joined, thus permitting the use of O-ring seals affording angular flexibility up to about 3° for the joint:

The drawback of this arrangement is that the components must be provided with relatively different sealing surfaces which complicates and multiplies stock-holding problems to cover a wide range of possible combinations.

It is an object of the present invention to provide an angularly adaptable sealing element in which at least some of the drawbacks are obviated or mitigated.

According to the present invention, there is provided an angularly adaptable sealing element for fitting between a pair of planar sealing surfaces provided at adjoining mutually connected pipe ends in a pipeline, comprising two rings parts and a casing surrounding the same at their outer end surfaces and at their inner diameter wherein mutually adjacent contacting surfaces of the two rings are spherically convex and concave respectively and are slidingly adjustable relative to each other.

Figure 2:
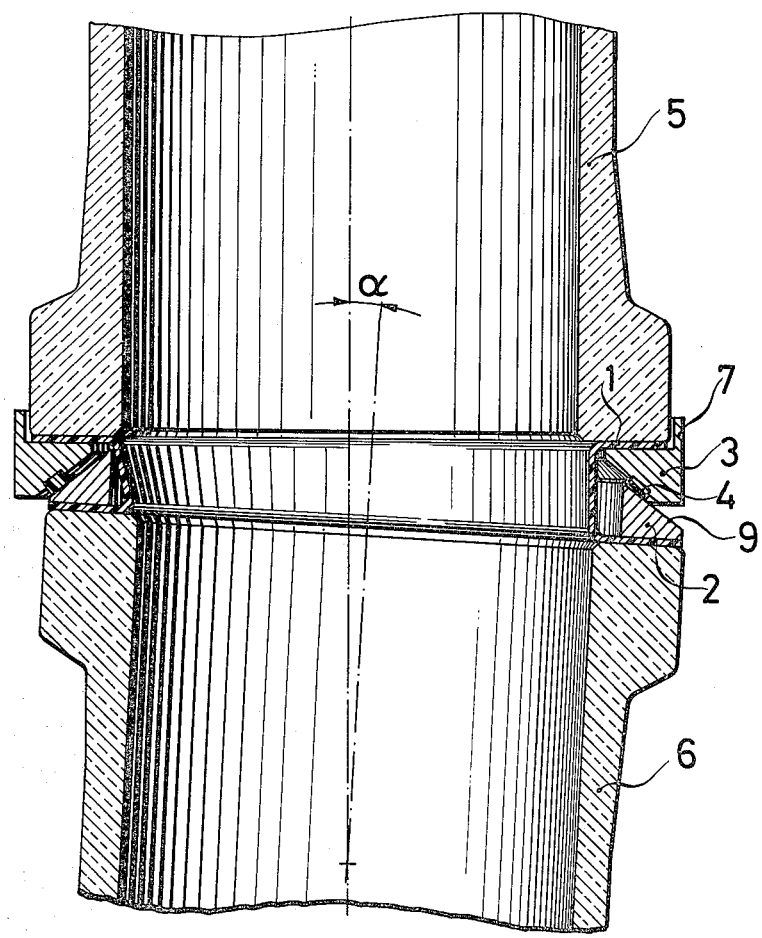

In the accompanying drawings:

FIG. 1 is a section through a pair of mutually joined and sealed pipe ends, the axes of which coincide and extend in the plane of the section, and FIG. 2 is a section of the same pipe joint of FIG. 1, but here the two axes, although in the plane of the section, do not coincide.

Referring now to FIG. 1, an angularly adaptable sealing element is disposed between the adjacent ends of two glass pipeline components (5) and (6) and includes a casing (1) of elastic and corrosion resistant material (e.g. P.T.F.E.) within which are arranged two insert rings (2) and (3) of a mechanically strong material (e.g. high grade steel). The casing (1) has a U-shaped section. Whilst outer end surfaces of these rings (2) and (3) which face the arms of the U-shaped section are designed in such a way as to achieve, with the said arms an effective seal on the planar sealing surfaces of the two pipeline components (5) and (6) which are held together in a conventional manner, not shown, mutually adjacent inner end surfaces of the rings are respectively designed as an inner cone-shaped surface (8) on the ring (3) and as a spherical segment surface (9) on the ring (2). The inner cone-shaped surface (8) is provided with an annular groove wherein an annular slider (4) is positively, i.e. form-locked, engaged. The slider (4) consists of an elastic material having a low coefficient, of friction e.g. P.T.F.E.

The casing (1) and the two insert rings (2) and (3) with the slider (4) are so constructed that during assembly the axes of the adjoining components may be relatively angled up to 3° without jeopardising the sealing function. Moreover, with pipelines containing a vacuum or internal pressure, and which are subject to temperature variations the strong annular inserts (2) and (3) provide support for the casing (1) and prevent the latter from being sucked in or forced out of the joint.

A centering collar (7) provided on the ring (3) assists centering of the seal during assembly and prevent the seal from slipping out laterally. The collar (7) may be provided on either or both of the rings (2) and (3).

FIG. 2 shows the seal according to FIG. 1, but here the axes of the adjoining pipe ends (5, 6) are mutually inclined by an angle $\alpha$ and the slider (4) has been displaced by a corresponding distance along the spherical segment surface (9). The seal is maintained because such displacement is permitted and also because deformation of the casing (1) is possible.

We claim:

1. An angularly adaptable sealing element for fitting between a pair of planar sealing surfaces provided at adjoining mutually connected pipe ends in a pipeline, comprising two ring parts and a casing surrounding the same at their outer end surfaces and at their inner diameter, wherein mutually adjacent contacting surfaces of the two rings are spherically convex and concave respectively and are slidingly adjustable relative to each other.

2. A sealing element according to claim 1, wherein one of the two contacting surfaces is spherical whilst the other surface has the configuration of the inside of a cone and includes means for receiving an annular slider.

3. A sealing element according to claim 2, wherein the slider is formed of a material having a low coefficient of friction.

4. A sealing element according to any one of claims 1 to 3, wherein said casing is formed of an elastic and chemically resistant material.

5. A sealing element according to any one of claims 1 to 3, wherein a centering collar is provided on the outside of one or both of said rings.

* * * * *